J. L. BOOTH.

Grain Separator.

No. 1,826. Reissued Nov. 29, 1864.

Witnesses:
J. L. Judson
Junius Judson.

Inventor:
J. L. Booth.
By J. Fraser & Co.
Attys.

N. PETERS, Photo-Lithographer, Washington, D. C.

UNITED STATES PATENT OFFICE.

JONATHAN L. BOOTH, OF ROCHESTER, NEW YORK.

IMPROVEMENT IN GRAIN-SEPARATORS.

Specification forming part of Letters Patent No. 25,481, dated September 20, 1859; Reissue No. 1,045, dated September 25, 1860; Reissue No. 1,826, dated November 29, 1864.

*To all whom it may concern:*

Be it known that I, JONATHAN L. BOOTH, formerly of Cuyahoga Falls, Ohio, but now of Rochester, in the county of Monroe and State of New York, did obtain Letters Patent of the United States September 20, 1859, for Improvements in Grain-Separators, which Letters Patent were reissued September 25, 1860; and I do hereby declare that the following is a full and exact description thereof, reference being had to the accompanying drawings, making part of this specification.

Figure 2:
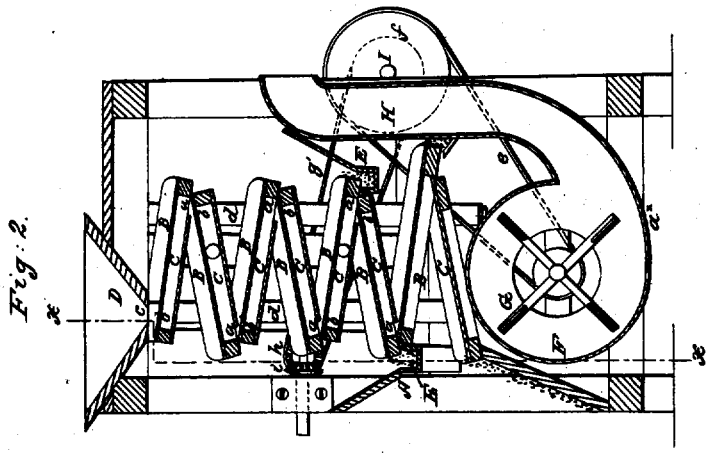
Figure 3:
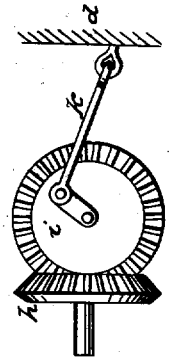
Figure 1:
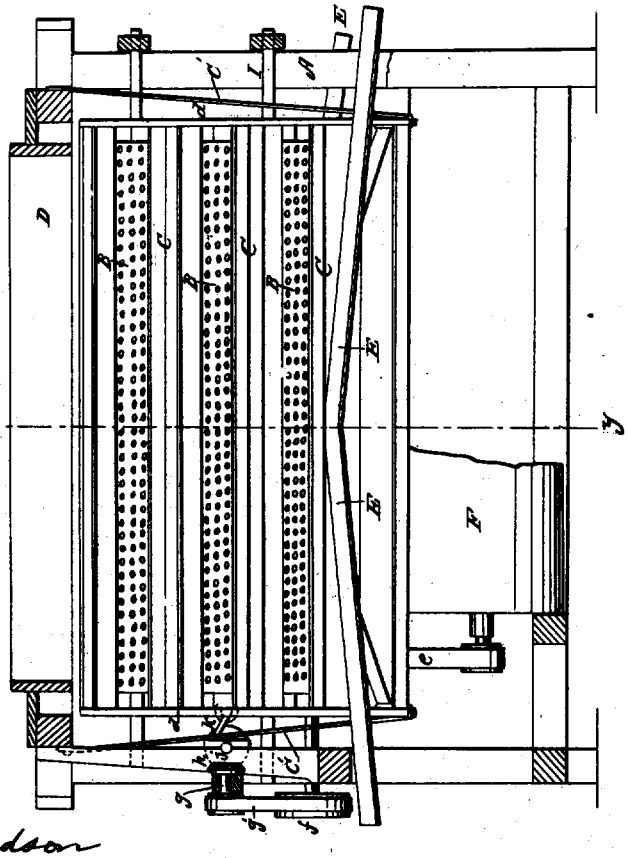

Figure 1 is a vertical longitudinal section of my invention in the plane of line *x x*, Fig. 2. Fig. 2 is a vertical transverse section in the plane of line *y y*, Fig. 1. Fig. 3 is a diagram showing the manner of shaking the screens.

Like letters of reference indicate corresponding parts in all the figures.

This invention consists in the employment or use of zigzag screens, and boxes or passages, having a proper lateral shake motion communicated to them, and so arranged that the grain may pass consecutively over and through them, and be subjected to a thorough screening operation; also, in using, in connection with the zigzag screens and boxes aforesaid, a revolving fan and spout so arranged that the grain will be subjected to an efficient blast for the separation of all light impurities therefrom.

In the accompanying drawings, A represents a suitable rectangular frame in which a series of inclined screens, B, are secured by elastic pendants C, or equivalent. The screens B may be formed of perforated zinc or other sheet metal and placed alternately in reversed inclined positions, as shown clearly in Fig. 2. Each screen B is placed on the top of what may be termed a "shallow box," C, which forms a passage for the grain, the boxes extending the whole length of the screens and receiving what passes through them, and discharging the same on the elevated ends of the succeeding screens immediately below them, openings *a* being made at the lower part of each box C to allow the escape of the contents therefrom. The upper or most elevated part of each screen B is provided with a smooth or unperforated surface, *b*, said surface *b* first receiving the grain, and consequently their position is immediately below the openings *a*, that of the uppermost screen being immediately below the discharge-orifice *c* of the hopper D. The screens and boxes are secured in proper position by uprights *d*, which are attached to each end of them, the elastic pendants C being secured to the lower ends of the uprights. The hopper D is of the usual form, about equal in length to the screens B, and is secured in the upper part of the frame A. To the lower parts of the uprights *d*, I usually secure inclined troughs E, said troughs being so placed as to catch the droppings from the screens and discharge the same at the ends of the machine. Within the frame A, at a suitable position, a fan-box, F, is placed containing a fan, G. The fan G is of ordinary construction, as well as the box F, and the latter communicates with an upright spout or passage, H, which receives at about the center of its height the contents of the lowest screen B. I prefer to use the spout F in the rear of the screens, as shown; but, if desirable, it may be used on the opposite side, or at either end, at right angles to its present position, with the same result.

At a suitable position there is placed a horizontal shaft, I, from which the fan G is driven by belts *e*, one at each end. At one end of the shaft I there is also placed a pulley, *f*, from which a small shaft, *g*, is driven by a belt, *g'*. The inner end of the shaft *g* has a bevel-pinion, *h*, placed on it, said pinion gearing into a corresponding pinion, *i*, which has a crank, *j*, at one end, from which a lateral shake motion, or a motion at right angles to the passage of the grain, is given the screens and boxes by a connecting-rod, K.

The operation is as follows: The grain to be separated and cleansed from impurities passes into the hopper D and through the opening *c* on the uppermost screen, B. The grain first strikes the smooth or imperforated portion *b* of said screen, and any oats that may be mixed with the grain are turned flatwise, and will pass off the depressed end of the screen. Some portion of oats, however, will pass through, but they will be discharged by the box C on the next screen below, and will be subjected to a like operation, a majority of the oats being separated from the wheat during each passage over the several screens; and when the grain reaches the last or lowermost screen all the oats will be separated therefrom, the lowermost screen B being a cockle-screen, the cockle being discharged from the lowermost box, C. The chess and other light impurities are discharged with the wheat from the cockle-screen into the spout H, and the chess and light impurities are blown upward out from the spout H, the grain being discharged at *a**. The oats drop into the troughs E and are discharged by them at each end of the machine.

By the employment of a series of zigzag screens instead of a single set the grain has the benefit of a long passage from ingress to exit, and therefore becomes free of oats, which is a matter of importance, especially in the separation of seed-wheat. At each reverse passage over the screens the grain is presented in a different position, so that the thorough agitation it receives is such as to settle the wheat to the bottom, so as to pass easily through the perforations, while the oats being of a lighter weight pass off over the top.

The advantage of giving a lateral shake to the screens, or one at right angles to the passage of the grain over their surfaces, is manifest. In the first place it is desirable to make the screens narrow in the direction that the grain runs, inasmuch as the wheat passes through the perforations of the screens readily in passing over a short distance, leaving the oats on top, while, if the distance is great, a greater quantity of the oats are also liable to pass through. The narrow screens, therefore, are more advantageous than wide ones would be. But if these narrow screens receive a longitudinal shake, or one in the direction of the passage of the grain, the grain will be thrown forward over the discharge end by the vibration without being effectively separated; and, second, the lateral agitation distributes the grain evenly over the screens and causes it to flow over the surface uniformly and regularly; whereas, if a longitudinal vibration is imparted, the grain is thrown forward and backward in jerks, so that a portion at least is thrown over instead of passing through.

What I claim is—

1. The combination of the zigzag screens and boxes B C when the same have a lateral shake motion, or one at right angles to the passage of the grain, in such a manner as to have the grain pass consecutively over and through them, and arranged relatively with each other to operate substantially as and for the purpose herein set forth.

2. The series of zigzag screens and boxes B C, with or without the troughs E, and having a lateral shake motion, in connection with the fan G and spout H, substantially as herein set forth.

JONATHAN L. BOOTH.

Witnesses:
R. F. OSGOOD,
JNO. L. JUDSON.